United States Patent [19]

de Moncuit

[11] Patent Number: 4,720,607

[45] Date of Patent: Jan. 19, 1988

[54] TACTILE SCREEN FOR DETERMINING THE COORDINATES OF A POINT ON A SURFACE

[75] Inventor: Frédéric de Moncuit, Paris, France

[73] Assignee: Boussois S.A., Levallois-Perret, France

[21] Appl. No.: 4,538

[22] Filed: Jan. 16, 1987

[30] Foreign Application Priority Data

Jan. 22, 1986 [FR] France ............................ 86 00862

[51] Int. Cl.⁴ .......................................... G08C 21/00
[52] U.S. Cl. .................................................. 178/18
[58] Field of Search ............................ 178/18, 19, 20

[56] References Cited

U.S. PATENT DOCUMENTS 3,806,912 4/1974 Eckert ............................ 178/18 X
4,571,577 2/1986 Taupin et al. ................... 178/18 X

FOREIGN PATENT DOCUMENTS 0073373 3/1983 European Pat. Off. .
0085012 8/1983 European Pat. Off. .
0147300 7/1985 European Pat. Off. .
59-135581 8/1984 Japan .

OTHER PUBLICATIONS

"A High-Resolution Imaging Touch Sensor", *International Journal of Robotics Research*, vol. 1, No. 2 (1982), by W. Daniel Hillis, pp. 33-44.

Primary Examiner—Stafford D. Schreyer
Attorney, Agent, or Firm—Young & Thompson

[57] ABSTRACT

A tactile screen for determining the coordinates of a point on a surface is formed by a support of glass, for example, which carries relatively spaced conductive strips made up of emitting and receiving strips in interjacent relation. The screen is intended to be touched by an object such as a user's finger in order to establish an electrical bridge between an emitting strip and a receiving strip. The conductive strips are converted with a membrane for providing the conductive strips with mechanical and electrical protection, the surface of the membrane which is adjacent to the conductive strips being conductive. The electrical resistance per unit area of the conductive surface is distinctly higher than that of the conductive strips when the membrane is not touched.

8 Claims, 7 Drawing Figures

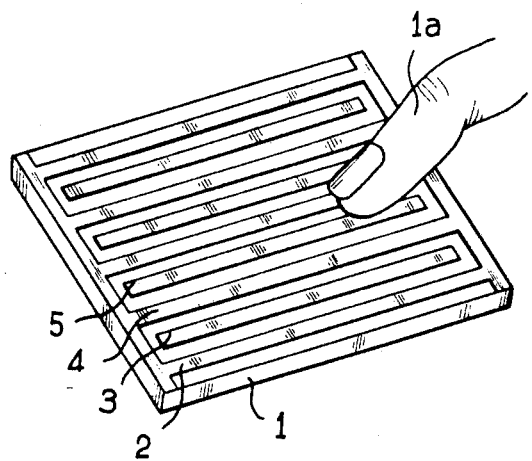
FIG_1
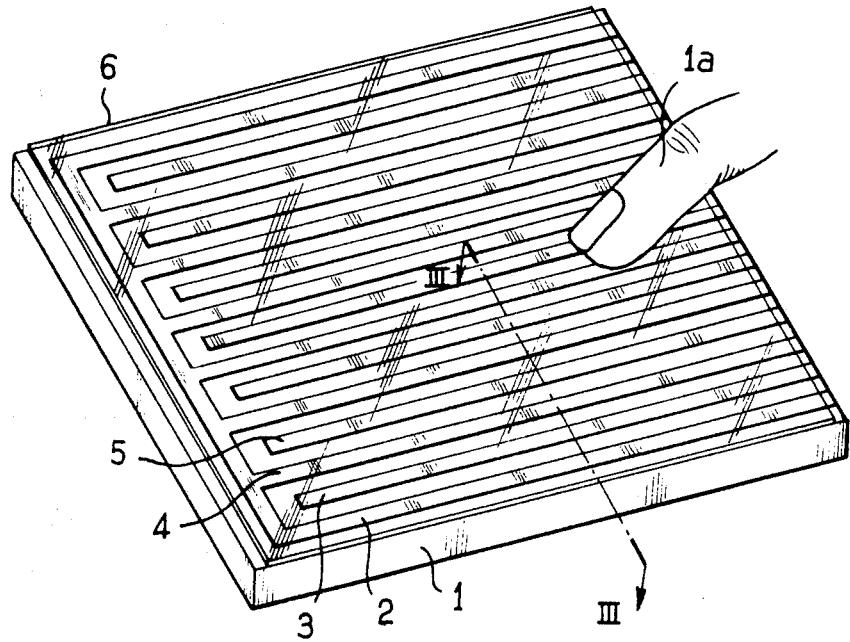
FIG_2

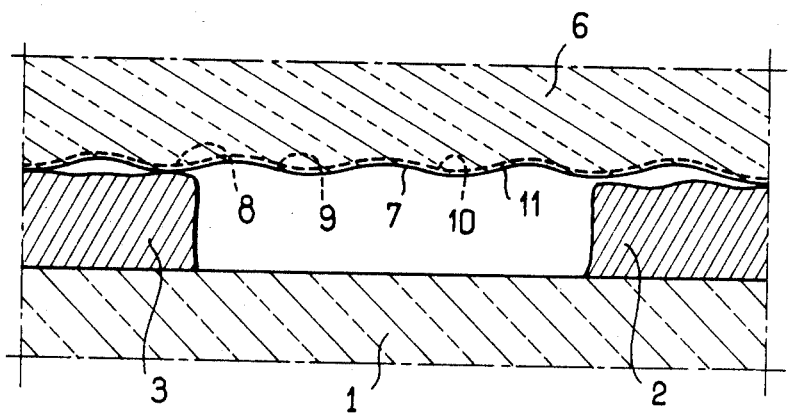
FIG.3
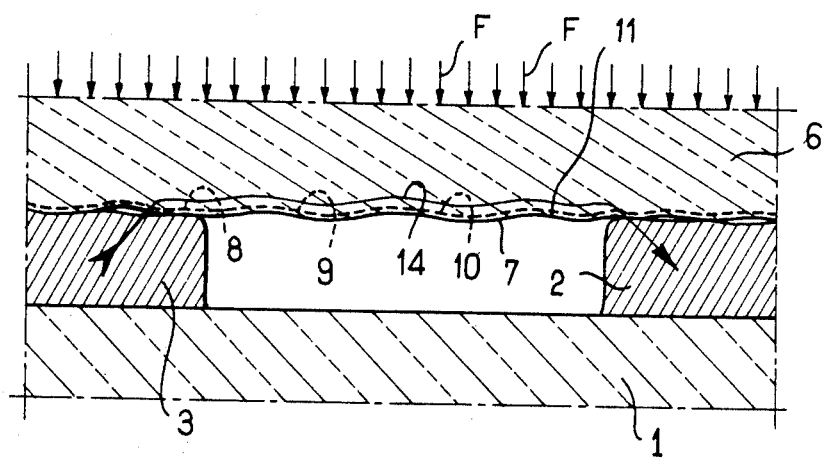
FIG.4
FIG.5

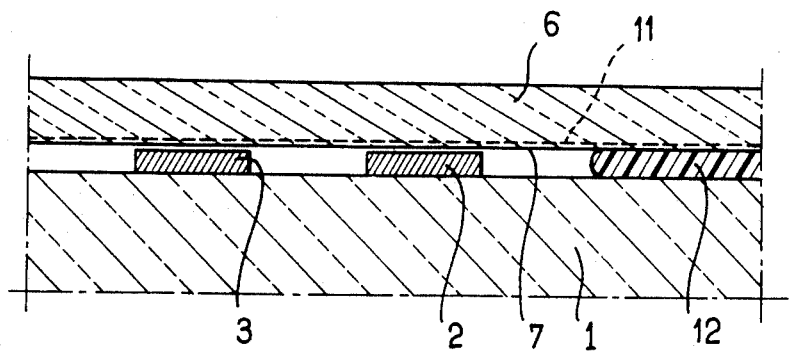
FIG_6
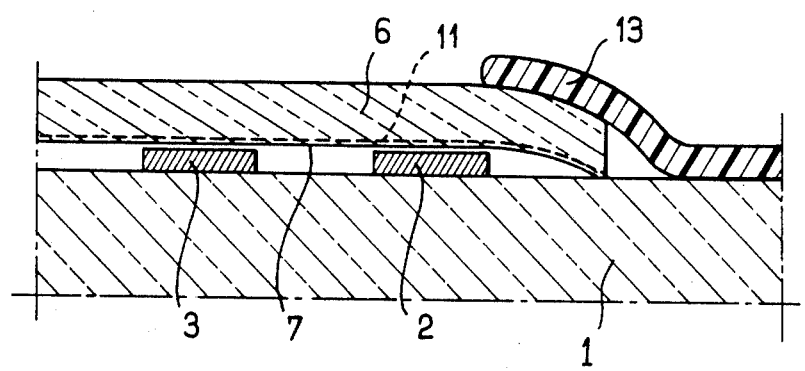
FIG_7

TACTILE SCREEN FOR DETERMINING THE COORDINATES OF A POINT ON A SURFACE

BACKGROUND OF THE INVENTION

1. Field of the Invention

The present invention relates to a tactile screen for determining the coordinates of a point on a surface, a screen support being provided with relatively spaced conductive strips made up of emitting strips and receiving strips in interjacent relation. Said screen is intended to be touched by an object such as a user's finger in order to establish an electrical bridge between an emitting strip and a receiving strip. The variation in electric potential on each emitting strip and receiving strip is measured in order to deduce therefrom the coordinates of the point of contact of the object aforesaid on the screen.

2. Description of the Prior Art

A tactile screen of this type has been described in French Pat. No. 2,520,498 granted to the present Applicant.

The present Applicant has observed that the operation of the device considered in the foregoing was sometimes liable to be disturbed when placed in a moist or dirty environment.

Moreover, the operation of this device is influenced by the variations in electrical resistance of the operator's finger or of the object employed for establishing an electrical bridge between the conductive strips of the screen.

The aim of the present invention is therefore to optimize the operation of the known tactile screen discussed above, irrespective of the physiological conditions of the operator or the conditions of the external medium in which the screen is located.

SUMMARY OF THE INVENTION

In accordance with the invention, the conductive strips of the screen are covered with a membrane in which the surface adjacent to said conductive strips is conductive. When the membrane is not touched, said conductive surface has an electrical resistance per unit area which is distinctly higher than that of the conductive strips, thereby making it possible to form an electrical bridge between an emitting strip and a receiving strip in the contact zone.

By means of this membrane, the conductive strips of the screen are protected from the external medium both mechanically and electrically. Moreover, this membrane provides the operator with total isolation.

In the state of rest, or in other words when no pressure is exerted on the membrane, no current passes between the adjacent emitting and receiving conductive strips by reason of the fact that the electrical resistance of the conductive surface of the membrane adjacent to said conductive strips is distinctly higher than that of said conductive strips. When the operator touches any point of the membrane with his finger, the local pressure of the finger on the membrane puts the conductive surface of this latter in contact with two juxtaposed emitting and receiving strips and establishes between these two strips a local electrical bridge which makes it possible as explained in French Pat. No. 2,520,498 to determine the X, Y coordinates of the point of contact between the finger and the screen.

In one advantageous embodiment of the invention, the electrical resistance of said conductive surface is at least twenty-five times higher than that of the conductive strips.

When this condition is satisfied, the air film formed between the conductive surface of the membrane and the conductive strips has the effect of permanently and sufficiently guarding against any electrical contact between the adjacent emitting and receiving conductive strips. The conductivity between the conductive surface of the membrane and the conductive strips becomes sufficient to establish an electrical bridge between two adjacent conductive strips only when the operator's finger or other object exerts a light local pressure on the membrane.

In a preferred embodiment of the invention, the membrane is a sheet of transparent plastic material provided with microelevations on that surface which is adjacent to the conductive strips, said surface being covered with a transparent conductive coating.

Preferably, the microelevations have a height within the range of 2.5 to 3 $\mu$m and the distance between these microelevations is within the range of 50 to 75 $\mu$m.

These microelevations provide the plastic sheet with a slight satin finish or so-called "scratch-brush" finish which is initially intended to obtain a non-reflecting appearance. The other face of the plastic sheet is advantageously polished.

These microelevations on which is applied a transparent conductive layer composed, for example, of indium oxide and stannic oxide produce a high electrical contact resistance between the membrane and the conductive strips. The result thereby achieved is that, when no pressure is exerted on said membrane, no electrical connection is established between the conductive layer aforesaid and the subjacent conductive strips.

Moreover, by virtue of the transparency of the conductive layer aforesaid, the presence of said layer does not modify the appearance of the image of the conductive strips as seen through the membrane.

BRIEF DESCRIPTION OF THE DRAWINGS

FIG. 1 is a view in perspective showing a tactile keyboard which has not been covered with the membrane in accordance with the invention.

FIG. 2 is a view in perspective to a larger scale showing the keyboard in accordance with the invention and covered with the membrane.

FIG. 3 is a sectional view taken along the plane III—III of FIG. 2.

FIG. 4 is a large-scale view of the detail IV of FIG. 3.

FIG. 5 is a view which is similar to FIG. 4 and illustrates the operation of the device in accordance with the invention.

FIG. 6 is a sectional view of the keyboard in accordance with the invention and shows the attachment of the membrane at the periphery of the keyboard.

FIG. 7 is a view which is similar to FIG. 6 and shows another mode of attachment of the membrane.

DESCRIPTION OF THE PREFERRED EMBODIMENTS

In the embodiment of FIGS. 1 and 2, the tactile screen for determining the coordinates of a point on a surface includes a support 1 made of glass, for example, and provided with conductive strips 2, 3, 4, 5 a few microns in thickness and disposed in spaced relation. These conductive strips are provided with emitting strips 2, 4 and receiving strips 3, 5 alternately disposed between said emitting strips. A screen of this type is described in French Pat. No. 2,520,498 granted to the present Applicant.

The screen illustrated in FIGS. 1 and 2 is intended to be touched by an object such as an operator's finger 1a in order to establish an electrical bridge between an emitting strip such as the strip 2 or 4 and a receiving strip such as the strip 3 or 5. Furthermore, means described in detail in the French patent cited above are provided for measuring the variation in electric potential in each of the emitting strips 2, 4 and receiving strips 3, 5 in order to deduce therefrom the X, Y coordinates of the point of contact of the finger 1a or other object on the screen.

In FIGS. 2, 3 and 4, it is apparent that the conductive strips 2, 3, 4, 5 are covered with a membrane 6, the surface 7 of said membrane which is adjacent to the conductive strips 2, 3, 4, 5 being conductive. When the membrane is not touched by a finger 1a or other object, said conductive surface 7 has an electrical resistance per unit area which is distinctly higher than that of the conductive strips 2, 3, 4, 5.

The electrical resistance of the conductive surface 7 is preferably at least twenty-five times higher than that of the conductive strips 2, 3, 4, 5.

In the embodiment which is illustrated, the membrane 6 is a sheet of transparent plastic material provided with microelevations 8, 9, 10 (as shown in FIG. 4), said microelevations being formed on that surface of said sheet which is adjacent to the conductive strips such as those designated by the reference numerals 2, 3, this surface being covered with a transparent conductive coating 11.

The microelevations formed on the plastic sheet 6 have the initial function of providing the surface of the plastic sheet with a non-reflecting satin finish or "scratch-brush" appearance.

The height of the microelevations 8, 9, 10 is preferably within the range of 2.5 to 3 $\mu$m and the distance between said microelevations is preferably within the range of 50 to 75 $\mu$m. By virtue of these microelevations 8, 9, 10, the surface of the plastic sheet 6 bears on the conductive strips 2, 3 only in single-point areas.

Preferably, the transparent plastic sheet 6 is of polycarbonate and its thickness is within the range of 100 to 300 $\mu$m and preferably 200 $\mu$m.

Thus said sheet 6 is sufficiently flexible to be capable of local deformation under the action of the pressure exerted by the operator's finger 1a while having a sufficient degree of rigidity to remain perfectly flat when no external force is applied.

Moreover, polycarbonate has the property of high transparency and is further distinguished by the fact that it does not generate harmful electrostatic charges in the presence of the glass which constitutes the support 1.

The transparent conductive coating 11 applied on that surface of the plasic sheet 6 which is provided with microelevations is preferably composed of indium oxide and of stannic oxide.

Deposition of said conductive layer 11 on the plastic sheet 6 can be performed in accordance with techniques which are conventional in microelectronics such as vacuum evaporation, for example.

The conductive layer 11 is sufficiently thin to be transparent and to endow the surface of the plastic sheet 6 with sufficiently high ohmic resistance having a value, for example, within the range of 500 to 3000 ohms per $cm^2$ whereas the ohmic value of the conductive strips 2, 3, 4, 5 is of the order of 20 ohms per $cm^2$.

The transparent membrane 6 is attached only at its periphery around the keyboard support 1, for example by means of a dielectric layer of adhesive 12 (as shown in FIG. 6) or by means of a transfer adhesive or a dielectric adhesive strip 13 (as shown in FIG. 7) which covers both the membrane 6 and the periphery of the glass support 1.

The membrane 6 provides mechanical and electrical protection of the conductive strips 2, 3, 4, 5 with respect to the external medium. Moreover, said membrane 6 makes the operation of the device insensitive to the state of the user's fingers and in particular to the electrical resistance of these latter. In particular, the user is permitted to wear gloves by virtue of the membrane 6. Furthermore, the membrane is electrically passive, is not connected electronically to the measuring device and does not require any maintenance.

When the keyboard in accordance with the invention is in the state of rest and no pressure is exerted on the membrane 6, the conductive layer 11 is in contact only at one point with two conductive strips 2, 3 located next to each other and adjacent to the zone of influence of the operator's finger 1a. By virtue of the relatively high ohmic value of the conductive layer 11, no electrical connection is established between the two conductive strips 2, 3.

When the operator's finger applies local pressure (a force of the order of 50 g) on the membrane 6 (see arrows F in FIG. 5), the electrical contact resistance between the conductive layer 11 and the conductive strips 2, 3 falls sharply, with the result that an electrical bridge 14 is established between these two conductive strips 2, 3.

Said electrical bridge 14 produces a variation in potential in the two conductive strips 2, 3, thus making it possible to determine the X, Y coordinates of the point of contact of the operator's finger on the keyboard, as described in the above-cited French Pat. No. 2,520,498.

As will readily be apparent, the invention is not limited to the embodiment described in the foregoing by way of example and any number of modifications may accordingly be contemplated without thereby departing either from the scope or the spirit of the invention.

Thus, the membrane 6 need not be transparent. It would be sufficient in this case to mark on the external face of the membrane, for example by means of lines, the outline of the conductive strips 2, 3, 4, 5 which are located beneath said membrane.

What is claimed is:

1. A tactile screen for determining the coordinates of a point on a surface, comprising a support (1) provided with relatively spaced conductive strips (2, 3, 4, 5) made up of emitting strips (2, 4) and receiving strips (3, 5) in interjacent relation, said screen being intended to be touched by an object such as a user's finger (1a) in order to establish an electrical bridge between an emitting strip and a receiving strip, said screen being associated with means for measuring the variation in electric potential on each emitting strip and receiving strip in order to deduce therefrom the coordinates of the point of contact of the object aforesaid on the screen, wherein the conductive strips (2, 3, 4, 5) are covered with a membrane (6) in which the surface (7) adjacent to said conductive strips is conductive, the electrical resistance per unit area of said conductive surface being distinctly higher than that of the conductive strips (2, 3, 4, 5) when said membrane (6) is not touched, thereby making it possible to form an electrical bridge between an emitting strip and a receiving strip in the contact zone.

2. A tactile screen in accordance witih claim 1, wherein the electrical resistance of said conductive surface (7) is at least twenty-five times higher than that of the conductive strips (2, 3, 4, 5).

3. A tactile screen in accordance with claim 1, wherein the membrane (6) is a sheet of transparent plastic material provided with microelevations (8, 9, 10) on that surface of said sheet which is adjacent to the conductive strips (2, 3, 4, 5), said surface being covered with a transparent conductive coating (11).

4. A tactile screen according to claim 3, wherein the height of the microelevations (8, 9, 10) is within the range of 2.5 to 3 $\mu$m and the distance between said microelevations is within the range of 50 to 75 $\mu$m.

5. A tactile screen according to claim 3, wherein the sheet of transparent plastic material (6) is of polycarbonate.

6. A tactile screen according to claim 3, wherein the thickness of the transparent plastic sheet (6) is within the range of 100 to 300 $\mu$m.

7. A tactile screen according to claim 3, wherein the transparent conductive coating (11) is composed of indium oxide and stannic oxide.

8. A tactile screen according to claim 1, wherein only the periphery of the membrane (6) is attached to the periphery of the screen support (1).

* * * * *